(12) United States Patent
Min (10) Patent No.: US 9,500,276 B2
(45) Date of Patent: Nov. 22, 2016

(54) SHIFT BY WIRE AUTO LEVER CONTROLLING STRUCTURE USING INTEGRATED CONTROLLER HAVING 2 BUTTONS

(71) Applicant: Hyundai Motor Company, Seoul (KR)

(72) Inventor: Jeong-Seon Min, Kwangju-Shi (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 14/536,405

(22) Filed: Nov. 7, 2014

(65) Prior Publication Data
US 2015/0167823 A1      Jun. 18, 2015

(30) Foreign Application Priority Data

Dec. 13, 2013  (KR) .................. 10-2013-0155548

(51) Int. Cl.
| | | |
|---|---|---|
| B60K 20/00 | (2006.01) | |
| B60K 23/00 | (2006.01) | |
| F16H 59/08 | (2006.01) | |
| F16H 59/02 | (2006.01) | |
| F16H 59/12 | (2006.01) | |

(52) U.S. Cl.
CPC .......... *F16H 59/08* (2013.01); *F16H 59/0217* (2013.01); *F16H 59/12* (2013.01); *F16H 2059/0221* (2013.01); *Y10T 74/2014* (2015.01)

(58) Field of Classification Search
CPC ............................... B60K 20/00; B60K 23/00
See application file for complete search history.

(56) References Cited

U.S. PATENT DOCUMENTS

| 5,906,645 A * | 5/1999 | Kagawa .................... B60T 7/12 180/167 |
| 8,386,141 B2 * | 2/2013 | Tanaka ................ F16H 59/0204 180/336 |
| 2009/0213068 A1 * | 8/2009 | Saez ................... G06F 3/03543 345/156 |
| 2012/0006139 A1 * | 1/2012 | Kim .................... F16H 59/0217 74/473.3 |

FOREIGN PATENT DOCUMENTS

| JP | 2001-71780 A | 3/2001 |
| KR | 10-2012-0006303 A | 1/2012 |
| KR | 10-2012-0025228 A | 3/2012 |
| KR | 10-2013-0067961 A | 6/2013 |

* cited by examiner

*Primary Examiner* — Tisha Lewis
(74) *Attorney, Agent, or Firm* — Morgan, Lewis & Bockius LLP

(57) ABSTRACT

A shift by wire auto lever controlling structure using an integrated controller having two buttons may include an integrated controller including a first button and a second button, and a control unit connected with the integrated controller and controls shifting in a vehicle in response to input signals of the integrated controller, wherein the control unit discriminates a long input signal and a short input signal of input signals from the first button and the second button of the integrated controller as different input signals, and combines the different input signals from the first button and the second button, and performs a Shift By Wire (SBW) mode for changing a current shift range to a predetermined shift range matched with a combination.

7 Claims, 10 Drawing Sheets

|  | short operation | long operation |
|---|---|---|
| button A | function (1) | function (2) |
| button B | function (3) | function (4) |

FIG. 4

|  | SBW operation mode | DBW operation mode |
|---|---|---|
| button A | shift range function operated | acceleration (accelerator stroke increased) |
| button B |  | deceleration (accelerator stroke decreased) |

| current input | P | R | N | D | M |
|---|---|---|---|---|---|
| [A] | R | P | R | R | + |
| (A) | R | P | P | P | + |
| [B] | N | N | D | N | - |
| (B) | D | D | D | M | D |

[A] button A pressed short    (A) button A pressed long
[B] button B pressed short    (B) button B pressed long

FIG. 7

| current<br>input | P | R | N | D | M |
|---|---|---|---|---|---|
| [A] | R | P | R | R | + |
| [A] | engine<br>stopped | P | P | P | + |
| [B] | N | N | D | N | - |
| [B] | D | D | D | M | D |

[A] button A pressed short    [A] button A pressed long
[B] button B pressed short    [B] button B pressed long

FIG. 10B able to achieve various lever designs and shifting patterns out of the existing auto lever designs and shifting patterns.
SHIFT BY WIRE AUTO LEVER CONTROLLING STRUCTURE USING INTEGRATED CONTROLLER HAVING 2 BUTTONS

CROSS-REFERENCE TO RELATED APPLICATION

The present application claims priority to Korean Patent Application No. 10-2013-155548 filed on Dec. 13, 2013, the entire contents of which is incorporated herein for all purposes by this reference.

BACKGROUND OF THE INVENTION

Field of the Invention

The present invention relates to a shift by wire auto lever controlling structure using an integrated controller having two buttons, and more particularly, to a technology of providing an integrated controller in a vehicle equipped with a Shift By Wire (SBW) auto lever, in which the controller of an SBW auto lever is composed of two buttons including a first button and a second button, all of shift ranges of a vehicle can be operated by input combinations of the first button and the second button, an SBW mode and a Drive By Wire (DBW) mode can be converted by specific input through the two buttons, control of starting/stopping the engine of a vehicle is possible by input through the two buttons in the DBW mode, the input device of the SBW auto lever is made simple, so that confusion and mistake with input of a driver are prevented and both of the SBW and DBW functions are provided.

Description of Related Art

In general, in a shift lever structure of the transmission of vehicles, a shift by wire (hereafter, referred to as 'SBW') auto lever structure is a system that has been developed from a system that shifts by mechanically pulling a cable used in the shift lever structures of the related art and is well known in the art as allowing shifting in response to an electronic signal from a shift lever. Since the SBW is composed of a sensor, a wire, and an actuator, it has the advantage of being able to achieve various lever designs and shifting patterns out of the existing auto lever designs and shifting patterns.

Figure 1A:
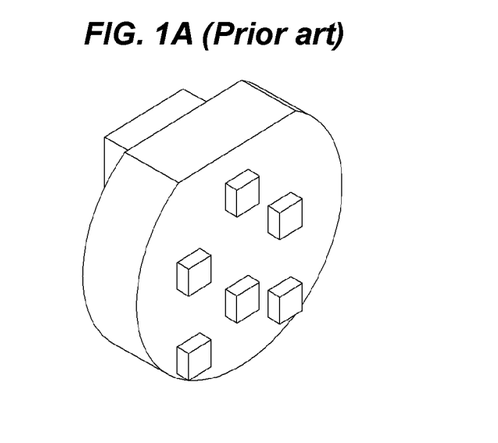
FIG. 1A, FIG. 1B, and FIG. 1C are views showing examples of auto levers with SBW (Shift By Wire) of the related art.
Figure 1B:
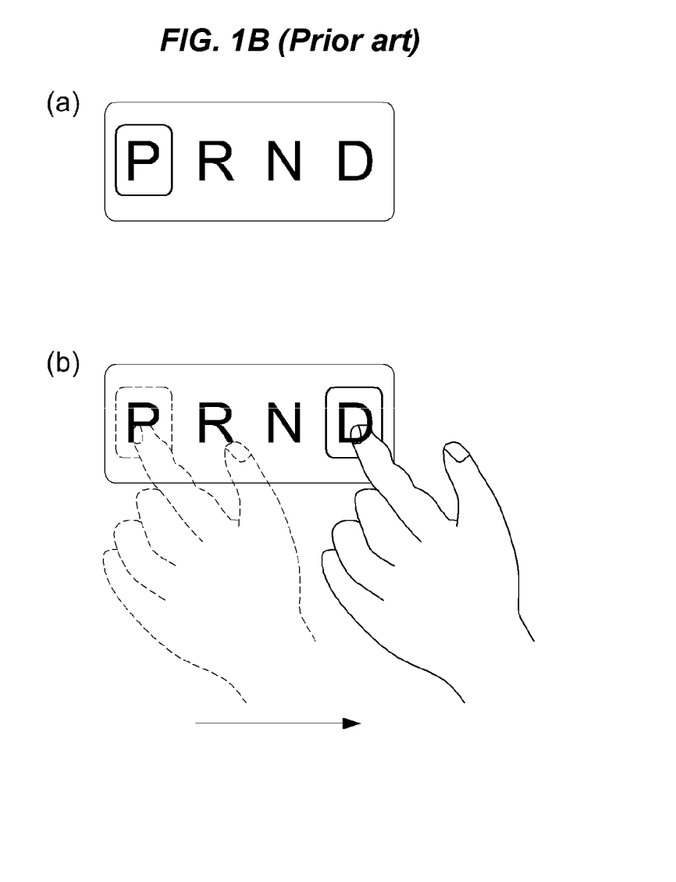
Figure 1C:
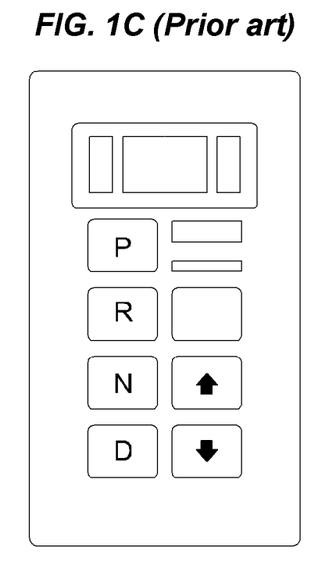

FIGS. 1A, 1B and 1C are views showing examples of auto levers with SBW of the related art. As shown in the figures, the SBWs of the related art have various input units (controllers) that generate electric signals in response to input by a driver, and accordingly, they have various shapes out of the typical lever design of the mechanical transmission systems of the related art.

In particular, the existing SBW auto levers include a plurality of buttons, for example, assigned to a P-range, an R-range, an N-range, and a D-range and the driver inputs a shift range by operating the button assigned to a predetermined shift range of the buttons. However, the button type controller has P, R, N, and D buttons, that is, as many as the number of shifting ranges and the buttons are simply arranged, so the driver has difficulty in recognizing them and has to check the button before shifting, and thus convenience of operation is deteriorated.

In particular, when the buttons assigned to shift ranges are simply arranged, the driver fails to recognize the shift ranges assigned to the buttons and has to check the buttons assigned to the shift ranges before operating them in every shifting, so the driver's eyes are turned to the shift buttons.

Further, the driver accustomed to operating the shift buttons due to frequently operating the shift buttons may operate the shift buttons of the button lever type of the related art assigned to shift ranges without checking them with eyes. However, in this case, there is still a problem in that the driver may make a mistake with operating them by confusing the positions of the button due to rapid or careless operation, and particularly, there is also inconvenience that it is required to operate three buttons in order to shift from the R-range to the P-range.

The description provided above as a related art of the present invention is just for helping in understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift by wire auto lever controlling structure using an integrated controller having two buttons providing an integrated controller, in which the controller of an SBW auto lever is composed of two buttons including a first button and a second button, all of shift ranges of a vehicle can be operated by input combinations of the first button and the second button, an SBW mode and a DBW mode can be converted by specific input through the two buttons, control of starting/stopping the engine of a vehicle is possible by input through the two buttons in the DBW mode, the input device of the SBW auto lever is made simple, so that confusion and mistake with input of a driver are prevented and both of the SBW and DBW functions are provided.

In an aspect of the present invention, a shift by wire auto lever controlling structure using an integrated controller having two buttons, may include an integrated controller including a first button and a second button, and a control unit connected with the integrated controller and controls shifting in a vehicle in response to input signals of the integrated controller, wherein the control unit discriminates a long input signal and a short input signal of input signals from the first button and the second button of the integrated controller as different input signals, and combines the different input signals from the first button and the second button, and performs a Shift By Wire (SBW) mode for changing a current shift range to a predetermined shift range matched with a combination.

The control unit combines the currently set shift range with the different input signals from the first button or the second button and shifts to the predetermined shift range matched with the combination.

The control unit converts the SBW mode and a Drive By Wire (DBW) (DBW) mode when simultaneously receiving inputs of the first button and the second button, and wherein a currently set shift range and a predetermined shift range matched with combinations of different input signals from the first button or the second button are different in the SBW mode and the DBW mode.

In the DBW mode, the control unit accelerates the vehicle when receiving an input signal from the first button, and decelerates the vehicle when receiving an input signal from the second button.

A predetermined shift range in the control unit may include at least one of a P-range, an R-range, an N-range, a D-range, an M-range, a higher (+) range, and a lower (−) range.

When simultaneously receiving inputs of the first button and the second button, the control unit operates a predetermined accessory device in the vehicle.

The first button and the second button may have different external shapes and/or are disposed at different heights.

When simultaneously receiving inputs of the first button and the second button, the control unit converts the SBW mode and the DBW mode only when the currently set shift range is a D-range.

According to the present invention having this configuration, in contrast to having a plurality of buttons assigned to shift ranges in the controllers of an SBW auto lever, it is possible to control shifting to all gears and start the engine of a vehicle only with a controller having two buttons, so the controller structure of the auto lever is simplified and the cost is reduced accordingly.

Further, as the controller structure is simplified, it becomes easy to ensure the interior layout of a vehicle equipped with the controller, so the present invention can be used for LH and RH vehicles and vehicles for the disabled and has improved an esthetic appearance. In particular, with the simple structure, the external appearance of an SBW auto lever where the present invention is applied can be adapted to various interior designs only by changing the shape and color of the buttons.

Finally, since the present invention allows for shifting only with the first button and the second button, the driver can recognize the object to operate by recognizing only the relative positions of the first button and the second button when operating them and the driver can shift to all gears only with a finger, so that the driver can more intuitively shift and be provided with excellent operability.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a technology of providing an integrated controller in a vehicle equipped with a shift by wire (SBW) auto lever, in which the controller of an SBW auto lever includes two buttons including a first button and a second button, all of shift ranges of a vehicle can be operated by input combinations of the first button and the second button, an SBW mode and a DBW mode can be converted by specific input through the two buttons, control of starting/stopping the engine of a vehicle is possible by input through the two buttons in the DBW mode, the input device of the SBW auto lever is made simple, so that confusion and mistake with input of a driver are prevented and both of the SBW and DBW functions are provided.

Hereinafter, exemplary embodiments of the present invention will be described in detail with reference to the accompanying drawings.

Figure 2:
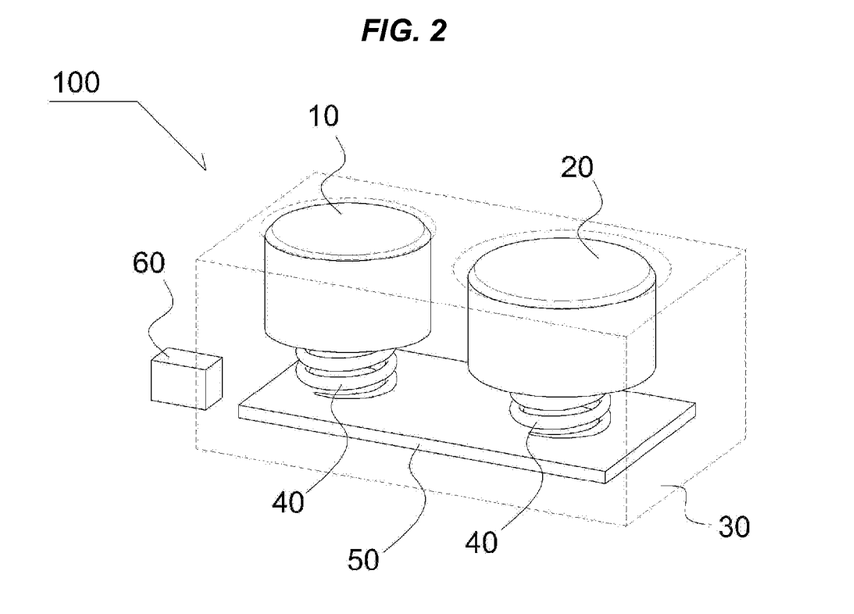
FIG. 2 is a view showing an integrated controller including two buttons in an exemplary embodiment of an SBW auto lever controlling structure using an integrated controller having two buttons.

FIG. 2 is a view showing an integrated controller 100 including two buttons of an SBW auto lever in an exemplary embodiment of an SBW auto lever controlling structure using an integrated controller having two buttons.

As shown in the figure, the integrated controller 100 of the present invention includes a first button 10 and a second button 20, which are operation parts for inputting.

The integrated controller 100 may further include a housing 30 that houses the first button 10 and the second button 20, springs 40 (provided for the first button 10 and the second button 20, respectively, as shown in the figure) that provides elasticity to the first button 10 and the second button 20, a PCB 50 that generates and outputs input signals in response to input through the first button 10 and the second button 20, and a connector 60 for connecting input and output terminals to the PCB 50, in which the configuration of the first button 10 and the second button 20 and the configuration of the housing 30, the springs 40, the PCB 50, and the connector 60 may be the same as the configuration of any input devices publicly known in the art without departing from the scope of the input device having two buttons which is the technical characteristic of the present invention. Further, the components may be formed in sizes appropriate to be mounted in a vehicle and in shapes appropriate to satisfy the interior design of a vehicle.

In an exemplary embodiment of the present invention, output signals from the integrated controller 100 are transmitted to control units (a shift range control unit, a control unit of SBW, etc.) in a vehicle so that shifting is controlled by the control units.

In an exemplary embodiment of the present invention, the first button 10 and the second button 20 may be formed in different size and shape. As described above, the first button 10 and the second button 20 having different sizes and shapes can be easily seen by a driver, so they provide the advantage of being able to reduce the possibility of wrong operation.

As described above, the SBW auto lever controlling structure using an integrated controller having two buttons of the present invention allows for operating all of shift ranges of a vehicle by combining the inputs from the first button 10 and the second button 20 and this operation is performed as follows in accordance with the input way in the integrated controller 100 described above. The technical configuration to be described hereafter explains an exemplary embodiment of the present invention and it should be clearly understood to those skilled in the art that the present invention is not limited thereto.

In an exemplary embodiment of the present invention, the first button 10 is assigned as a button used for stopping and parking a vehicle and the second button 20 is assigned as a button used for driving, which is assigned to a shift range that is frequently used in driving.

Further, in an exemplary embodiment of the present invention, both the SBW (Shift By Wire) and the DBW (Drive By Wire) of the related art can be controlled through the two buttons.

Figure 3:
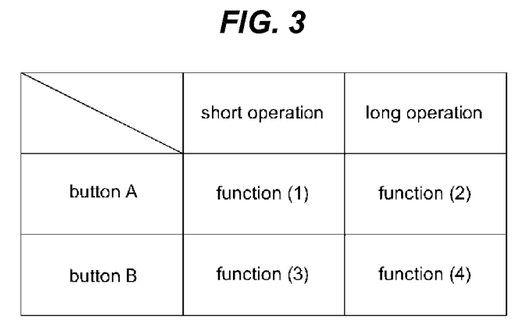
FIG. 3 is a selectable table for various different functions according to combinations of output signals from buttons of an integrated controller having two buttons.

FIG. 3 is a selectable table for various different functions according to combinations of output signals from buttons of the integrated controller 100 having two buttons.

As shown in the figure, the integrated controller 100 can operate the first button 10 long or short and the difference in operation way can be recognized as different operations by a control unit to be described below. As described above, the function 1 or the function 2 can be selected in accordance with different operations of the first button 10, and the function 3 and the function 4 can be selected in accordance with different operations of the second button 20.

Figure 4:
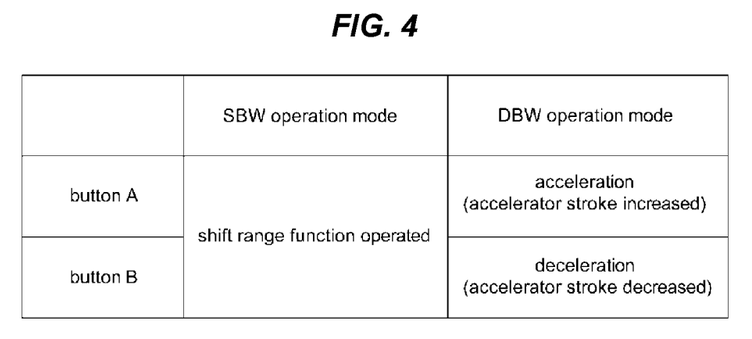
FIG. 4 is an another selectable table for various different functions according to combinations of output signals from buttons of an integrated controller having two buttons.

The integrated controller 100 that provides four selectable different functions, as described above, may allow for selection of other functions by changing the mode other than the functions described above, and selection of functions is shown in the table of FIG. 4.

The operation and function selection by the integrated controller 100 are described in detail hereafter.

Figure 5:
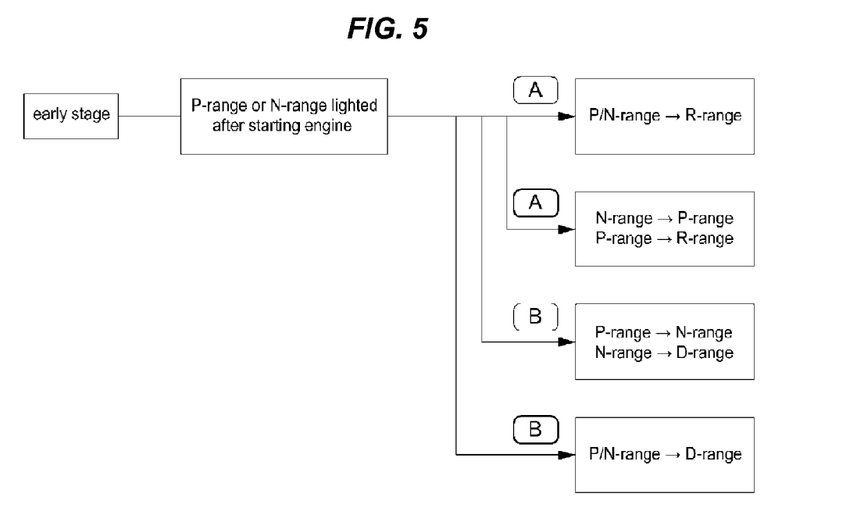
FIG. 5 is a view showing a basic operation logic tree of an SBW auto lever controlling structure using an integrated controller having two buttons according to various exemplary embodiments of the present invention.
Figure 6:
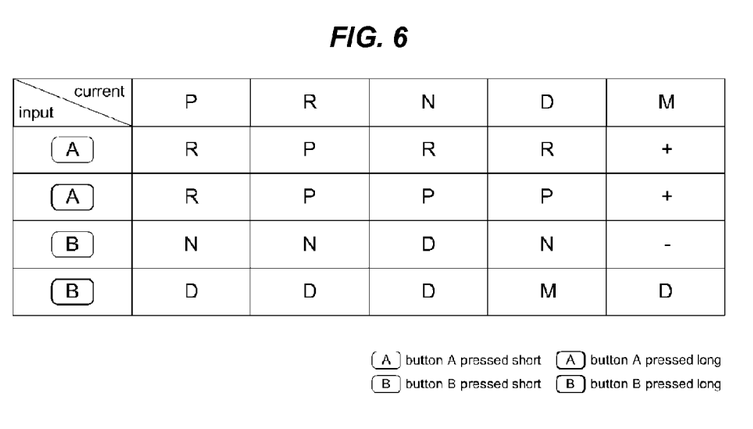
FIG. 6 is a table showing changed structures of shift ranges set in accordance with input from an integrated controller.

FIG. 5 is a view showing a basic operation logic tree of an SBW auto lever controlling structure using an integrated controller having two buttons according to a first embodiment of the present invention and FIG. 6 is a table showing changed structures of shift ranges set in accordance with input from the integrated controller 100.

As shown in the figures, the SBW auto lever controlling structure using an integrated controller having two buttons according to the first embodiment of the present invention receives output signals from the first button 10 and the second button 20 of the integrated controller 100 as input signals (hereafter, generally referred to as 'input signals) through the control unit and controls shifting corresponding to the input signals.

First, in idling at the early stage, after the engine of a vehicle is started, the control unit displays the shift range currently set in the control unit, that is, the current shift range of the vehicle, for example, the P-range or the N-range through a shift range display unit and/or a shift range display unit (hereafter, generally referred to as 'shift range display unit') provided with the integrated controller 100 in a cluster.

The control unit combines the currently set shift range with signals inputted from the integrated controller 100, recognizes them as different operations, and controls shifting, which follows the method described below.

First, when receiving a short input signal of the first button 10 from the integrated controller 100, the control unit changes the currently set shift range to the R-range if the currently set shift range is the N-range, and changes the currently set shift range to the R-range if the currently set shift range is the P-range.

Further, when receiving a long input signal of the first button 10 from the integrated controller 100, the control unit changes the currently set shift range to the P-range if the currently set shift range is the N-range, and changes the currently set shift range to the R-range if the currently set shift range is the P-range.

Further, when receiving a short input signal of the second button 20 from the integrated controller 100, the control unit changes the currently set shift range to the D-range if the currently set shift range is the N-range, and changes the currently set shift range to the N-range if the currently set shift range is the P-range.

Further, when receiving a long input signal of the second button 20 from the integrated controller 100, the control unit changes the current set shift range to the D-range if the current set shift range is the N-range, and changes the current set shift range to the D-range if the current set shift range is the P-range.

In the first embodiment of the present invention, shifting to the M-stage and shifting to a higher (+) gear and a lower (−) gear can be performed by the integrated controller 100 and this configuration is shown in detail in FIG. 6.

As shown in FIG. 6, the control unit shifts to the M-range or the D-range in response to a long input signal from the second button 20.

If the currently set range in the control unit is the P-range, the R-range, or the N-range, the control unit changes the currently set range to the D-range when receiving a long input signal from the second button 20 of the integrated controller 100.

In contrast, when the currently set shift range is the D-range in the control unit, the control unit changes the currently set range to the M-range when receiving a long input signal from the second button 20 of the integrated controller 100.

Further, when the currently set shift range is the M-range in the control unit, the control unit changes the currently set range to the D-range when receiving a long input signal from the second button 20 of the integrated controller 100.

When the currently set shift range in the control unit is the M-range, the control unit changes the currently set range to a higher (+) range when receiving a short input signal from the first button 10 of the integrated controller 100, and changes the currently set range to a lower (−) range when receiving a long input signal from the first input button 10 of the integrated controller 100.

Accordingly, in the first embodiment of the present invention having this configuration, it is possible to shift to the P-range, the N-range, the D-range, the M-range, the higher (+) range, and the lower (−) range in response to input signals of the integrated controller 100 composed of the first button 10 and the second button 20.

As shown in FIG. 6, when the currently set range in the control unit is the P-range, a short input signal or a long input signal of the first button 10 causes shifting to the R-range, so confusion of the driver is prevented and operation convenience is increased.

Further, when the current set range in the control unit is the N-range, a short input signal or a long input signal of the second button 20 causes shifting to the D-range, so confusion of the driver is prevented and operation convenience is increased.

Further, when the current set shift range in the control unit is the M-range, the first button 10 causes shifting to the higher (+) range and the input of the second button 20 causes shifting to the lower (−) range, so recognition becomes easy and operation convenience is increased.

As a result, the driver can easily shift only by memorizing that the first button 10 participates in shifting to the P-range and the R-range, and the second button 20 participates in shifting to the N-range and the D-range, so there is no need to additionally learn for the operation and the operation is easy.

Figure 7:
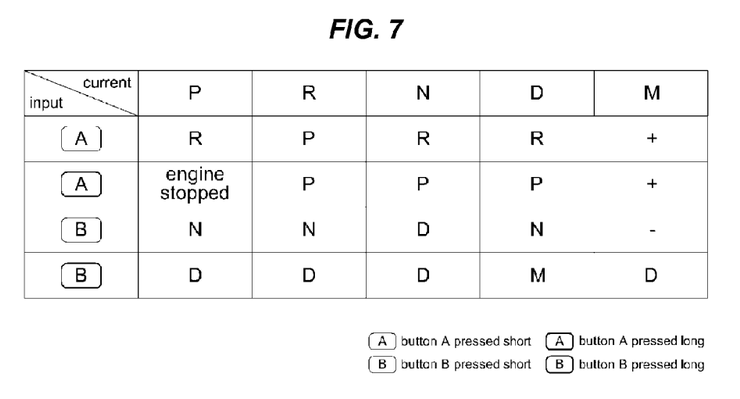
FIG. 7 is a table showing changes of shift ranges set in accordance with input signal from an integrated controller in an SBW auto lever controlling structure using an integrated controller having two buttons according to various exemplary embodiments of the present invention.

FIG. 7 is a table showing changes of shift ranges set in accordance with input signal from the integrated controller 100 in an SBW auto lever controlling structure using an integrated controller having two buttons according to a second embodiment of the present invention.

In the second embodiment of the present invention, starting/stopping the engine can be controlled by the integrated controller 100. In this case, the control unit is connected with an engine control unit in a vehicle and controls starting/stopping the engine.

The controlling structure of the second embodiment is somewhat the same as the control table of the first embodiment shown in FIG. 6, but starting/stopping the engine of a vehicle is controlled in response to the input signals of the first button 10.

In other words, the control unit stops the engine of the vehicle when the currently set shift range of the vehicle is the P-range and a long input signal of the first button 10 is received, and starts the engine of the vehicle when a long input signal of the first button 10 is received again with the engine off.

Accordingly, the driver of a vehicle equipped with the SBW auto lever controlling structure using an integrated controller having two buttons of the second embodiment can control starting/stopping the engine of the vehicle only with the integrated controller 100.

Figure 8:
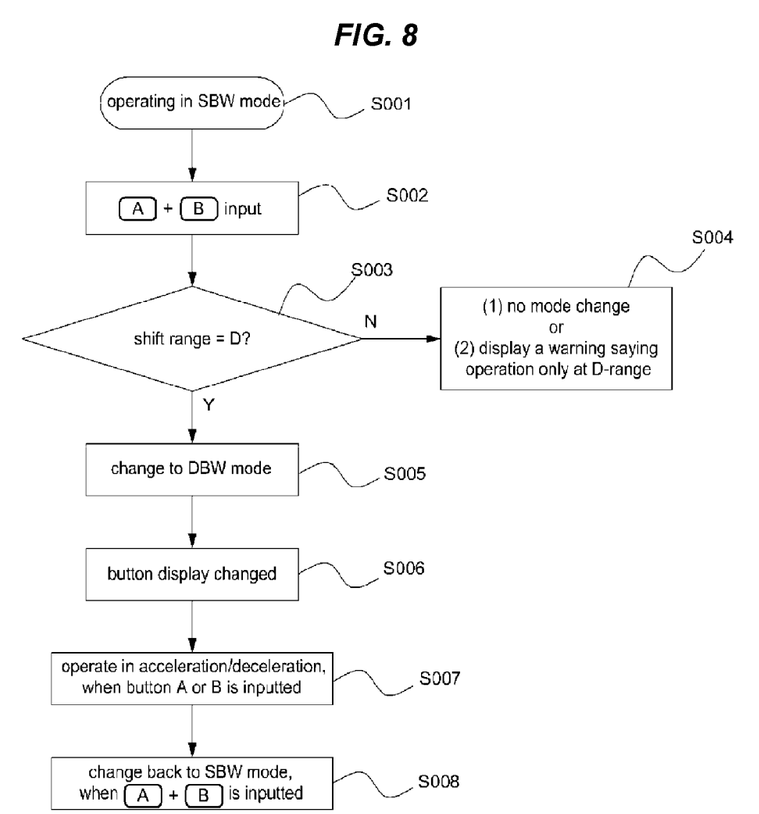
FIG. 8 is a view showing an SBW auto lever controlling structure using an integrated controller having two buttons according to various exemplary embodiments of the present invention.

FIG. 8 is a view showing an SBW auto lever controlling structure using an integrated controller having two buttons according to a third embodiment of the present invention.

In the third embodiment of the present invention, the controller increases or decreases the accelerator stroke of the engine driving system of a vehicle by operating in a DBW mode other than the SBW mode described in the first embodiment and the second embodiment, so acceleration and deceleration in a drive mode of a vehicle are controlled by the integrated controller 100.

The conversion between the SBW mode and the DBW mode is performed by the control unit, when input signals of the first button 10 and the second button 20 are simultaneously received in the control unit, that is, when the user performs inputting simultaneously through the first input unit 10 and the second input unit 20.

In an exemplary embodiment of the present invention, when the currently set shift range is not the D-range, in other words, when the mode is changed to the DBW mode by the control unit at shift ranges other than the D-range, the changing to the DBW mode is not meaningful in most cases because it is required to shift to the D-range soon, and it makes the driver feel inconvenient, so that the mode is changed from the SBW mode to the DBW mode by simultaneous input through the first button 10 and the second button 20 only when the currently set shift range is the D-range.

First, as shown in FIG. 8, when inputs through the first button 10 and the second button 20 are simultaneously inputted to the control unit (S001) operating in the SBW mode of the first embodiment or the second embodiment (S002), the control unit determines whether the currently set shift range is the D-range (S003).

When it is determined that the shift range set in the control unit is not the D-range in the step (S003), the control unit keeps the SBW mode, that is, keeps the control of the first embodiment or the second embodiment without changing the mode, or may outputs a message saying that the currently set mode has not been changed or a warning message that induces shifting for mode change (S004). This process may be performed in connection with a display unit in the cluster of the vehicle.

In contrast, when it is determined that the current set shift range in the control unit is the D-range in the step (S003), the control unit changes the currently set mode to the DBW mode (S005) and controls the display unit of the integrated controller 100 to display the currently set mode (S006).

The control unit controls shifting, corresponding to the inputs of the first button 10 and the second button 20 in the SBW mode, but when the mode is changed to the DBW mode in the step S005, the control unit accelerates or decelerates the vehicle by increasing or decreasing the accelerator stroke in response to the inputs of the first button 10 and the second button 20 (S007).

Thereafter, when simultaneously receiving the input signals of the first button 10 and the second button 20 in operation in the DBW mode, the control unit changes the currently set DBW mode back to the SBW mode and controls shifting (S008).

Figure 9:
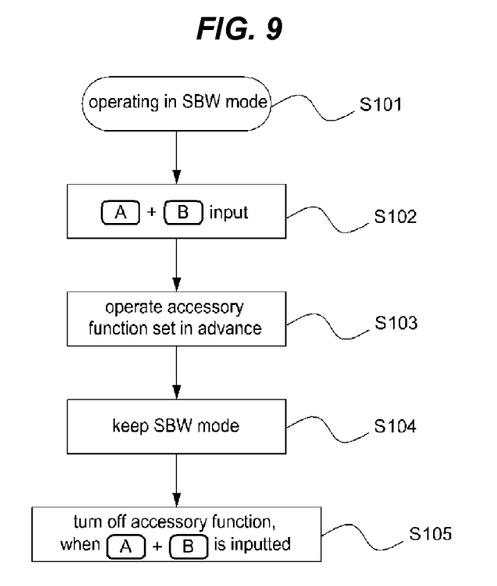
FIG. 9 is a view showing an SBW auto lever controlling structure using an integrated controller having two buttons according to various exemplary embodiments of the present invention.

FIG. 9 is a view showing an SBW auto lever controlling structure using an integrated controller having two buttons according to a fourth embodiment of the present invention.

In the fourth embodiment of the present invention, the control unit operates a predetermined system in a vehicle, when input signals of the first button 10 and the second button 20 are simultaneously inputted in operation in the SBW mode. In this case, the predetermined system (hereafter, referred to as an "accessory system") may include various electronic device in the vehicle or the components of the driving system for driving the vehicle, for example, a navigation system, an audio system, or a telephone system.

Since the integrated controller 100 is positioned where the driver can more conveniently operate it, convenience for the driver can be largely increased if the accessory device can be operated by operating the integrated controller 100. The control process of the fourth embodiment of the present invention is as follows.

First, as shown in FIG. 9, when inputs of the first button 10 and the second button 20 are simultaneously received in the control unit (S101) operating in the SBW mode of the first embodiment or the second embodiment (S102), the control unit operates a predetermined system (S103), in which, similarly, the control unit keeps the SBW mode and controls shifting in response to the inputs of the first button 10 and the second button 20.

Thereafter, when the control unit simultaneously receives input signals of the first button 10 and the second button 20 in controlling for operating the predetermined system, it stops the predetermined system that is currently set or performs other functions (S105).

Figure 10A:
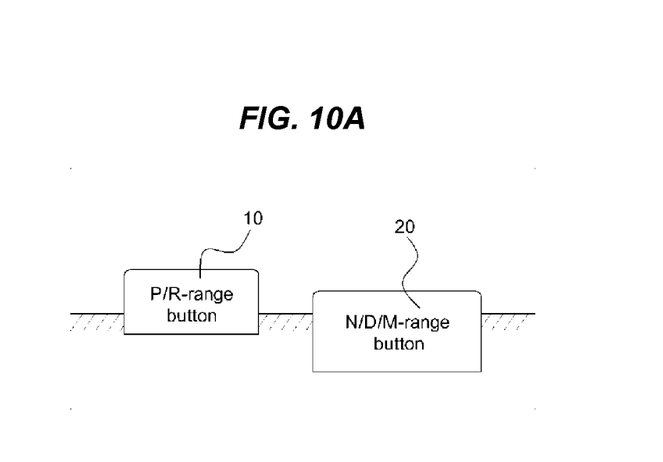
FIG. 10A and FIG. 10B are side view and plan view showing the shape of a button of an integrated controller according to a preferred embodiment of the present invention.
Figure 10B:
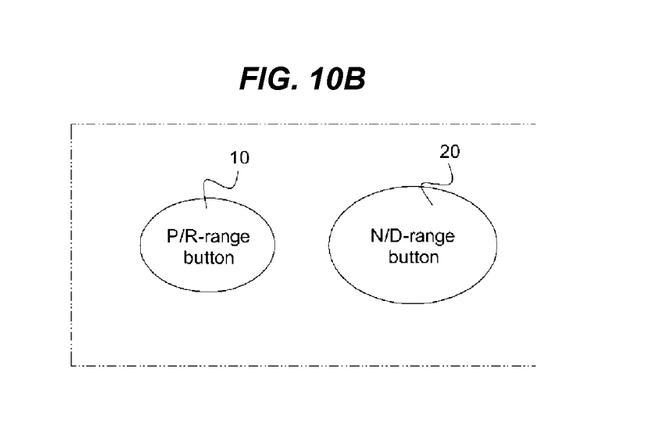

FIGS. 10A and 10B are a side view and a plan view showing the shape of a button of the integrated controller 100 according to an exemplary embodiment of the present invention.

As shown in the figure, in an exemplary embodiment of the present invention, in order to prevent wrong operation by making the first button 10 and the second button 20 of the integrated controller 100 be easily recognized, as shown in FIG. 10A, the first button 10, that is, the button assigned to control the P-range and the R-range and the second button 20, that is, the button assigned to control the N-range, the D-range, and the M-range are arranged with a height difference, that is, arranged with the tops at different heights.

Further, as shown in FIG. 10B, the first button 10, that is, the button assigned to control the P-range and the R-range and the second button 20, that is, the button assigned to control the N-range, the D-range, and the M-range may have different sizes or different external shapes.

Accordingly, the driver can shift to the P-range and the R-range and the N-range, the D-range, and the M-range, using the integrated controller 100 having the configuration described above, and can shift without a wrong operation by using only two buttons when shifting.

Although embodiments of an SBW auto lever controlling structure using an integrated controller having two buttons of the present invention were described above, those are only specific examples for helping in understanding of the present invention, not limiting the scope of the present invention. It is apparent to those skilled in the art that the present invention may be modified in various ways on the basis of the spirit of the present invention other than the exemplary embodiments described herein.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift by wire auto lever controlling structure using an integrated controller having two buttons, comprising:
    an integrated controller including a first button and a second button; and
    a control unit connected with the integrated controller and controls shifting in a vehicle in response to input signals of the integrated controller,
    wherein the control unit discriminates a long input signal and a short input signal of input signals from the first button and the second button of the integrated controller as different input signals, and combines the different input signals from the first button and the second button, and performs a Shift By Wire (SBW) mode for changing a current shift range to a predetermined shift range matched with a combination,
    wherein the control unit converts the SBW mode and a Drive By Wire (DBW) mode when simultaneously receiving inputs of the first button and the second button, and
    wherein a currently set shift range and a predetermined shift range matched with combinations of different input signals from the first button or the second button are different in the SBW mode and the DBW mode.

2. The structure of claim 1, wherein the control unit combines the currently set shift range with the different input signals from the first button or the second button and shifts to the predetermined shift range matched with the combination.

3. The structure of claim 1, wherein in the DBW mode, the control unit accelerates the vehicle when receiving an input signal from the first button, and decelerates the vehicle when receiving an input signal from the second button.

4. The structure of claim 1, wherein a predetermined shift range in the control unit includes at least one of a P-range, an R-range, an N-range, a D-range, an M-range, a higher (+) range, and a lower (−) range.

5. The structure of claim 1, wherein when simultaneously receiving inputs of the first button and the second button, the control unit operates a predetermined accessory device in the vehicle.

6. The structure of claim 1, wherein the first button and the second button have different external shapes and/or are disposed at different heights.

7. The structure of claim 1, wherein when simultaneously receiving inputs of the first button and the second button, the control unit converts the SBW mode and the DBW mode only when the currently set shift range is a D-range.

\* \* \* \* \*